United States Patent
Cora et al.

(10) Patent No.: US 11,667,781 B2
(45) Date of Patent: Jun. 6, 2023

(54) POLYVINYL CHLORIDE COMPOSITIONS CONTAINING IMPACT MODIFIERS AND CALCIUM CARBONATE

(71) Applicant: Dow Global Technologies LLC, Midland, MI (US)

(72) Inventors: Bernard Cora, Haguenau (FR); David Armstrong, Haguenau (FR)

(73) Assignee: Dow Global Technologies, LLC, Midland, MI (US)

( * ) Notice: Subject to any disclaimer, the term of this patent is extended or adjusted under 35 U.S.C. 154(b) by 625 days.

(21) Appl. No.: 16/625,359

(22) PCT Filed: Jun. 18, 2018

(86) PCT No.: PCT/US2018/038042
§ 371 (c)(1),
(2) Date: Dec. 20, 2019

(87) PCT Pub. No.: WO2018/236735
PCT Pub. Date: Dec. 27, 2018

(65) Prior Publication Data
US 2021/0324188 A1    Oct. 21, 2021

(30) Foreign Application Priority Data

Jun. 20, 2017  (EP) .................................... 17290082

(51) Int. Cl.
| C08L 27/06 | (2006.01) |
| C08F 20/06 | (2006.01) |
| C08K 3/26 | (2006.01) |
| C08K 5/101 | (2006.01) |

(52) U.S. Cl.
CPC .............. *C08L 27/06* (2013.01); *C08F 20/06* (2013.01); *C08K 3/26* (2013.01); *C08K 5/101* (2013.01); *C08K 2003/265* (2013.01); *C08K 2201/005* (2013.01); *C08K 2201/011* (2013.01); *C08L 2207/53* (2013.01)

(58) Field of Classification Search
CPC ..... C08L 27/06; C08K 3/26; C08K 2003/265; C09C 1/02; C09C 1/021; C09C 1/022; C09C 1/024
See application file for complete search history.

(56) References Cited

U.S. PATENT DOCUMENTS

| 5,441,816 A | 8/1995 | Grohman |
| 8,378,013 B2 | 2/2013 | Pirri et al. |
| 8,779,051 B2 * | 7/2014 | Kisin ...................... C08L 77/00 525/902 |
| 9,085,679 B2 | 7/2015 | Rachwal |
| 2012/0322939 A1 | 12/2012 | Jiang et al. |
| 2015/0000564 A1 * | 1/2015 | Blanchard ............... C04B 14/28 423/430 |
| 2016/0002434 A1 | 1/2016 | Pirri et al. |
| 2016/0264785 A1 * | 9/2016 | Pohl ........................ C04B 14/28 |

FOREIGN PATENT DOCUMENTS

| EP | 1111001 A2 | 6/2001 |
| EP | 1548058 A1 | 6/2005 |
| EP | 2594605 A2 | 5/2013 |
| EP | 2628775 A1 | 8/2013 |
| WO | 2010099160 A1 | 9/2010 |
| WO | 2015041443 A1 | 3/2015 |
| WO | 2016050698 A1 | 4/2016 |

* cited by examiner

Primary Examiner — Brieann R Johnston
(74) Attorney, Agent, or Firm — Brian L. Mutschler

(57) ABSTRACT

Provided are polyvinyl chloride profile compositions comprising (a) polyvinyl chloride having a K value of from K-63 to K-70, (b) an impact modifier, and (c) ground calcium carbonate having (i) a $d_{50}$ particle size value of 400 to 900 nm, (ii) a $d_{98}$ particle size value of less than 2.6 μm, and (iii) a ratio of particles having a $d_{50}$ particle size value to particles having a $d_{20}$ particle size value ($d_{50}/d_{20}$) of less than 2.0.

8 Claims, 3 Drawing Sheets

POLYVINYL CHLORIDE COMPOSITIONS CONTAINING IMPACT MODIFIERS AND CALCIUM CARBONATE

FIELD OF THE INVENTION

This invention relates generally to polyvinyl chloride profile compositions containing impact modifiers and calcium carbonate.

BACKGROUND

Acrylic impact modifiers and calcium carbonate fillers are a critical component of polyvinyl chloride ("PVC") end use application such as window and technical profiles. Such components provide performance properties required of PVC composites, for example, gelation rate, processing rheology, gloss, color, and impact strength. Impact modifiers and calcium carbonate fillers as currently used in the industry can counteract each other, however, making it difficult to achieve a single formulation that exhibits sufficiently favorable performance in all of such properties.

Various impact modifiers and grades of calcium carbonate have been utilized in the industry for a variety of PVC products. For example, WO 2016/050698 A1 discloses certain PVC compositions containing acrylic impact modifiers and calcium carbonate. The prior art does not, however, disclose a PVC formulation according to the present invention, which achieves a synergy between specific calcium carbonates and impact modifiers.

Accordingly, there is a need to develop PVC formulations containing acrylic impact modifiers and calcium carbonate that do provide improvements in impact strength, processing rheology, gelation rate, gloss, and color.

STATEMENT OF INVENTION

One aspect of the invention provides a polyvinyl chloride composition comprising (a) polyvinyl chloride having a K value of from K-63 to K-70, (b) an impact modifier, and (c) ground calcium carbonate having (i) a $d_{50}$ particle size value of 400 to 900 nm, (ii) a $d_{98}$ particle size value of less than 2.6 µm, and (iii) a ratio of particles having a $d_{50}$ particle size value to particles having a $d_{20}$ particle size value ($d_{50}/d_{20}$) of less than 2.0.

In another aspect, the invention provides a polyvinyl chloride composition comprising (a) polyvinyl chloride having a K value of from K-65 to K-68, (b) a multistage acrylic impact modifier comprising (i) 65 to 96 weight % of a core polymer, based on the total weight of the multistage acrylic impact modifier, comprising polymerized units derived from (A) 95 to 99.9 weight % of one or more alkyl acrylate monomers, and (B) 0.1 to 1.5 weight % of one or more cross-linking monomers, graft-linking monomers, and combinations thereof, based on the total weight of the core, and (ii) 4 to 35 weight % of a shell polymer, based on the total weight of the multistage acrylic impact modifier, comprising polymerized units derived from (A) 95 to 100 weight % of one or more alkyl(meth)acrylate monomers, and (B) 0 to 2 weight % of one or more chain transfer agents, based on the total weight of the shell, and (c) ground calcium carbonate having (i) a $d_{50}$ particle size value of 400 to 900 nm, (ii) a $d_{98}$ particle size value of less than 2.6 µm, and (iii) a ratio of particles having a $d_{50}$ particle size value to particles having a $d_{20}$ particle size value ($d_{50}/d_{20}$) of less than 2.0.

DETAILED DESCRIPTION

Figure 1:
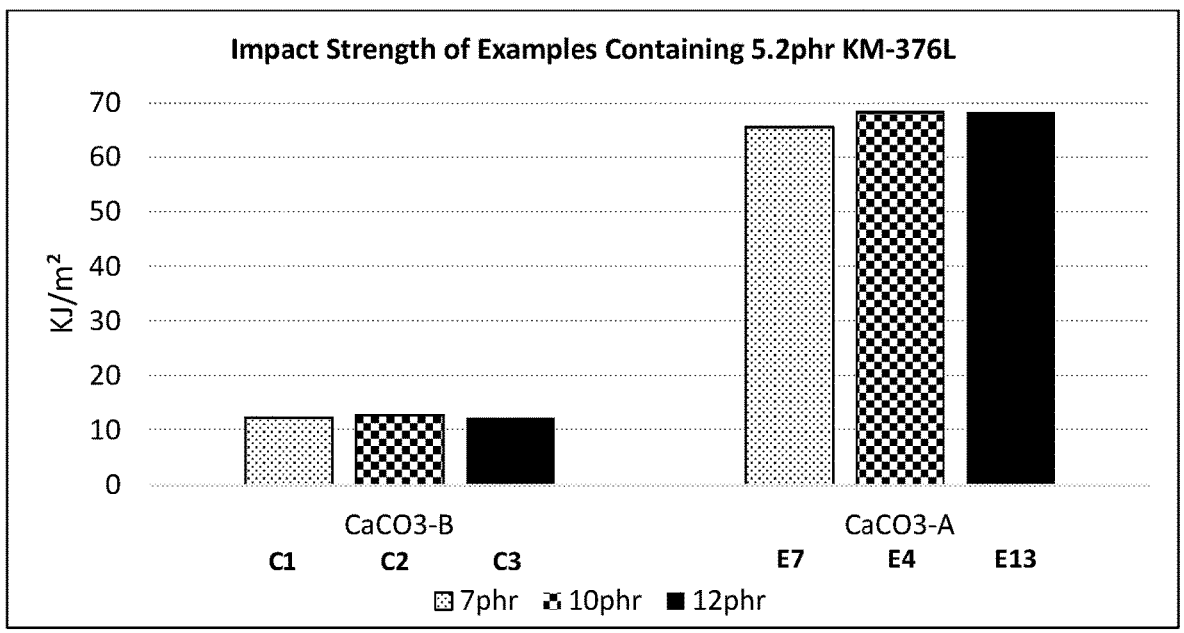
FIG. 1 shows the impact strength profiles of exemplary PVC profile compositions in accordance with the present invention and comparative PVC profile compositions.

The inventors have now surprisingly found that polyvinyl chloride ("PVC") compositions containing polyvinyl chloride, impact modifiers, and ground calcium carbonate having (i) a $d_{50}$ particle size value of 400 to 900 nm, (ii) a $d_{98}$ particle size value of less than 2.5 µm, and (iii) a ratio of particles having a $d_{50}$ particle size value to particles having a $d_{20}$ particle size value ($d_{50}/d_{20}$) of less than 2.0 provide significant improvements in impact strength, processing rheology, gloss, and color.

As used herein, the term "polymer" refers to a polymeric compound prepared by polymerizing monomers, whether of the same or a different type. The generic term "polymer" includes the terms "homopolymer," "copolymer," "terpolymer," and "resin." As used herein, the term "polymerized units derived from" refers to polymer molecules that are synthesized according to polymerization techniques wherein a product polymer contains "polymerized units derived from" the constituent monomers which are the starting materials for the polymerization reactions. As used herein, the term "(meth)acrylate" refers to either acrylate or methacrylate or combinations thereof, and the term "(meth)acrylic" refers to either acrylic or methacrylic or combinations thereof. As used herein, the term "substituted" refers to having at least one attached chemical group, for example, alkyl group, alkenyl group, vinyl group, hydroxyl group, carboxylic acid group, other functional groups, and combinations thereof. As used herein, the term "first polymeric stage" refers to any stage of the acrylic copolymer. It can be the only stage in a single stage polymer or the first, second, third, last, or any stage, chronologically, in a multistage polymer. As used herein, the term "second polymeric stage" refers to any other stage of the acrylic copolymer that is not the first stage. It can be the first, second, third, last, or any stage, chronologically, in a multistage polymer.

As used herein, the term "phr" means per hundred parts resin or polymer solids. As used herein, the term "molecular weight" or "weight average molecular weight" or "$M_w$" refers to the weight average molecular weight of a polymer as measured by gel permeation chromatography ("GPC"), for acrylic polymers against polystyrene calibration standards following ASTM D5296-11 (2011), and using tetrahydrofuran ("THF") as the mobile phase and diluent. As used herein, the term "particle size" means the weight average particle size of the emulsion (co)polymer particles as measured using a Brookhaven BI-90 Particle Sizer.

As used herein, the terms "glass transition temperature" or "$T_g$" refers to the temperature at or above which a glassy polymer will undergo segmental motion of the polymer chain. Glass transition temperatures of a copolymer can be estimated by the Fox equation (*Bulletin of the American Physical Society*, 1 (3) Page 123 (1956)) as follows:

$$1/T_g = w_1/T_{g(1)} + w_2/T_{g(2)}$$

For a copolymer, $w_1$ and $w_2$ refer to the weight fraction of the two comonomers, and $T_{g(1)}$ and $T_{g(2)}$ refer to the glass transition temperatures of the two corresponding homopolymers made from the monomers. For polymers containing three or more monomers, additional terms are added ($w_n$/$T_{g(n)}$). The glass transition temperatures of the homopolymers may be found, for example, in the "Polymer Handbook," edited by J. Brandrup and E. H. Immergut, Interscience Publishers. The $T_g$ of a polymer can also be measured by various techniques, including, for example, differential scanning calorimetry ("DSC"). As used herein, the phrase "calculated $T_g$" shall mean the glass transition temperature as calculated by the Fox equation.

As used herein, the terms "$d_{20}$", "$d_{50}$", and "$d_{98}$" particle size values refer to the size at which 20%, 50%, and 98%, respectively, of mass of agglomerated particles is accounted for by particles having a diameter less than or equal to the specified value. Thus, the $d_{50}$ value is the "weight median particle size" at which 50 weight % of all particles are smaller than the indicated particle size. As used herein, the term "$d_{50}/d_{20}$" refers to the ratio of particles having a $d_{50}$ particle size value to particles having a $d_{20}$ particle size value. The $d_{20}$, $d_{50}$, and $d_{98}$ values can be determined by various techniques, including, for example, by a Sedigraph™ III Plus (available from Micromeritics Instrument Corporation) utilizing the sedimentation method (i.e., an analysis of sedimentation behavior in a gravimetric field).

The inventive PVC compositions comprise polyvinyl chloride, an impact modifier, and ground calcium carbonate. The polyvinyl chlorides of the inventive composition can be obtained by conventional suspension polymerization, emulsion polymerization, bulk polymerization, or solution polymerization in the presence of initiators. In certain embodiments, the polyvinyl chloride is present in the PVC profile composition in an amount of from 70 to 90 weight %, preferably of from 75 to 85 weight %, and more preferably of from 77 to 83 weight %, based on the total weight of the PVC profile composition. K-values are correlated with solution viscosities and molecular weights of PVC as set forth in ISO 1628 2:1998. The preferred K-value range is from K-63 to K-70, preferably of from K-64 to K-69, and more preferably of from K-65 to K-68.

The inventive PVC compositions comprise an impact modifier. In certain embodiments, the impact modifier is present in the PVC profile composition in an amount of from 1 to 8 phr, preferably of from 3 to 7 phr, and more preferably of from 4 to 6 phr, based on the total weight of the PVC profile composition. Suitable impact modifiers include, for example, methacrylate-butadiene-styrene copolymers ("MBS"), acrylonitrile-butadiene-styrene copolymers ("ABS"), chlorinated polyethylene ("CPE"), acrylic-grafted chlorinated polyethylene, acrylic-grafted PVC, and acrylic impact modifiers ("AIM").

Suitable multistage acrylic impact modifiers include, for example, those having a core-shell morphology comprising a core polymer and a shell polymer. In certain embodiments, the core polymer is present in the multistage polymer in an amount of from 65 to 96 weight %, preferably 85 to 96 weight %, and more preferably of from 88 to 94 weight %, based on the total weight of the multistage polymer. In certain embodiments, the shell polymer is present in the multistage polymer in an amount of from 4 to 35 weight %, preferably 5 to 15 weight %, and more preferably of from 6 to 12 weight %, based on the total weight of the multistage acrylic impact modifier. In certain embodiments, the multistage acrylic impact modifier comprises one or more intermediate layer polymers between the core polymer and the shell polymer.

The core of the multistage acrylic impact modifier comprises polymerized units derived from one or more alkyl acrylate monomers. The alkyl acrylate monomers comprise linear and branched alkyl acrylates wherein the alkyl group has from 1 to 12 carbon atoms. Suitable alkyl acrylate monomers include, for example, ethyl acrylate, butyl acrylate, 2-ethyl hexyl acrylate, cyclopentyl acrylate, cyclohexyl acrylate, benzyl acrylate, and isooctylacrylate. In certain preferred embodiments, the alkyl acrylate monomers of the cross-linked core comprise one or more of butyl acrylate and 2-ethylhexyl acrylate. In certain embodiments, the alkyl acrylate monomers are present in the core in an amount of from 95 to 99.9 weight %, preferably of from 97 to 99.5 weight %, and more preferably of from 98 to 99 weight %, based on the total weight of the core.

The core of the multistage polymer further comprises polymerized units derived from one or more cross-linking monomers, graft-linking monomers, and combinations thereof. Suitable cross-linking and graft-linking monomers include, for example, butanediol di(meth)acrylate, ethylene glycol di(meth)acrylate, divinyl benzene, diethylene glycol di(meth)acrylate, diallyl maleate, ally acrylate, allyl methacrylate, diallyl phthalate, triallyl phthalate, and trimethylolpropane tri(meth)acrylate. In certain embodiments, the cross-linking monomers and graft-linking monomers of the cross-linked core comprise allyl methacrylate. In certain embodiments, the cross-linking monomers and graft-linking monomers are present in the cross-linked core in an amount of from 0.1 to 1.5 weight %, preferably of from 0.2 to 1.0 weight %, and more preferably of from 0.3 to 0.8 weight %, based on the total weight of the core.

The shell of the inventive multistage acrylic impact modifier comprises one or more of alkyl(meth)acrylate monomers. The alkyl(meth)acrylate monomers comprise linear and branched alkyl(meth)acrylates wherein the alkyl group has from 1 to 12 carbon atoms. Suitable alkyl(meth)acrylate monomers include, for example, methyl methacrylate, ethyl acrylate, butyl acrylate, butyl methacrylate, 2-ethyl hexyl acrylate, cyclopentyl acrylate, cyclohexyl acrylate, benzyl acrylate, benzyl methacrylate, and isooctylacrylate. In certain preferred embodiments, the alkyl(meth) acrylate monomers of the shell comprise methyl methacrylate. In certain embodiments, the alkyl(meth)acrylate monomers are present in the shell in an amount of from 95 to 100 weight %, preferably of from 96 to 99 weight %, and more preferably of from 97 to 98 weight %, based on the total weight of the shell.

In certain embodiments, the shell of the inventive multistage acrylic impact modifier further comprises polymerized units derived from one or more chain transfer agents. Suitable chain transfer agents include, for example, 1-dodecanethiol, t-dodecanethiol, thioethanol, hexanethiol, mercaptopropionic acid, methyl-3-mercaptopropionate, butyl-3-mercaptopropionate. In certain embodiments, the chain transfer agents are present in the shell in an amount of from 0 to 1.5 weight %, preferably of from 0.05 to 1 weight %, and more preferably of from 0.1 to 0.5 weight %, based on the total weight of the shell.

In certain embodiments, the multistage acrylic impact modifier further comprises one or more intermediate layers between the core and shell, each of which independently contains polymerized units derived from the monomer compositions described above for the entirety of the core and shell polymers. The multistage acrylic impact modifier may contain, for example, one, two, three, four, or five intermediate layers. In certain embodiments, the one or more intermediate layers contains a compositional gradient between the sub-layers such that the $T_g$ transitions from a minimum to a maximum over the width of the entire first intermediate layer. In certain embodiments, the calculated $T_g$ transitions from a lower limit of −50° C., −40° C., −30° C., −25° C., −15° C., or 0° C., to an upper limit of 70° C., 55° C., 35° C., or 15° C. While not wishing to be bound by theory, it is believed that the compositional gradient is achieved by the proper selection of and manner and timing of addition of monomers during the emulsion polymerization process used to prepare the first intermediate layer. A multistage polymerization process may be used during which monomers are added in stages, rather than all at once, to the emulsion polymerization reactor (or reactor vessel), permitting an interpenetration of one layer into adjacent layers resulting in a $T_g$ gradient over the first intermediate layer.

In certain embodiments, the multistage acrylic impact modifiers have a particle size in the range of from 100 to 500 nm, preferably of from 100 to 300 nm, more preferably of from 120 to 220 nm, and even more preferably of from 150 to 200 nm, as measured by a Brookhaven BI-90 Particle Sizer.

Suitable polymerization techniques for preparing the polymers contained in the inventive polymer compositions include, for example, emulsion polymerization and solution polymerization, preferably emulsion polymerization, as disclosed in U.S. Pat. No. 6,710,161. Aqueous emulsion polymerization processes typically are conducted in an aqueous reaction mixture, which contains at least one monomer and various synthesis adjuvants, such as the free radical sources, buffers, and reductants in an aqueous reaction medium. In certain embodiments, a chain transfer agent may be used to limit molecular weight. The aqueous reaction medium is the continuous fluid phase of the aqueous reaction mixture and contains more than 50 weight % water and optionally one or more water miscible solvents, based on the weight of the aqueous reaction medium. Suitable water miscible solvents include, for example, methanol, ethanol, propanol, acetone, ethylene glycol ethyl ethers, propylene glycol propyl ethers, and diacetone alcohol. In certain embodiments, the aqueous reaction medium contains more than 90 weight % water, preferably more than 95 weight % water, and more preferably more than 98 weight % water, based on the weight of the aqueous reaction medium.

The inventive PVC compositions comprise calcium carbonate. Suitable calcium carbonate includes, for example, ground natural calcium carbonate ("GCC", as distinguished from precipitated calcium carbonate). In certain embodiments, the ground calcium carbonate has a $d_{50}$ particle size value of from 400 to 900 nm, preferably from 400 to 800 nm, and more preferably from 400 to 700 nm. In certain embodiments, the ground calcium carbonate has a $d_{98}$ particle size value of less than 2.6 μm, preferably less than 2.5 μm, and more preferably less than 2.4 μm. In certain embodiments, the ground calcium carbonate has a ratio of particles having a $d_{50}$ particle size value to particles having a $d_{20}$ particle size value ($d_{50}/d_{20}$) of from 2.0 to 1.3, preferably from 1.8 to 1.4, and more preferably from 1.7 to 1.5. In certain embodiments, the ground calcium carbonate is present in the PVC profile composition in an amount of from 4 to 25 phr, preferably 5 to 20 phr, and more preferably of 6 to 18 phr, based on the total weight of the PVC profile composition.

The PVC profile compositions of the present invention are readily prepared by dry-blending or compounding methods that are known in the art of PVC processing. For example, the polyvinyl chloride, acrylic impact modifiers, and ground calcium carbonate of the present invention can be blended and processed using high-speed hot/cold mixers, and/or co-kneader extruders.

In certain embodiments, the inventive PVC profile compositions further comprise $TiO_2$. Suitable grades of $TiO_2$ include, for example a rutile grade $TiO_2$. In certain embodiments, the $TiO_2$ is present in the PVC profile composition in an amount of from 3 to 10 phr, preferably from 3.5 to 8 phr, and more preferably from 4 to 6 phr, based on the total weight of the PVC profile composition.

The inventive polymer compositions may also contain other optional ingredients that include, for example, thermal stabilizers, plasticizers, antioxidants, UV absorbers and light stabilizers, dyes, pigments, flame retardant agents, and other additives to prevent, reduce, or mask discoloration or deterioration caused by heating, aging, or exposure to light or weathering. The amount of optional ingredients effective for achieving the desired property provided by such ingredients can be readily determined by one skilled in the art.

As noted above, the PVC profile compositions of the present invention have end use applications including, for example, as for use in window profiles, pipes, technical profiles, wall panels, ceiling panels, cladding panels, or wire insulation. The inventive PVC profile compositions can be processed into a film and/or sheet by way of extrusion, calendering, or injection molding.

Some embodiments of the invention will now be described in detail in the following Examples.

EXAMPLES

Example 1

Particle Size Characterization of Exemplary and Comparative Ground Calcium Carbonate Exemplary ground calcium carbonate for use in PVC profile compositions in accordance with the present invention and comparative calcium carbonate for use in comparative PVC profile compositions have the particle size properties as recited in Table 1.

TABLE 1

Characterization of Exemplary and Comparative Calcium Carbonate

| Sample | $d_{50}$ (μm) | $d_{98}$ (μm) | $d_{50}/d_{20}$ |
|---|---|---|---|
| $CaCO_3$-A | 0.60 | 2.3 | 1.64 |
| $CaCO_3$-B* | 0.85 | 5 | 2.27 |

*Comparative

The $d_{20}$, $d_{50}$, and $d_{98}$ values were determined by a Sedigraph™ III Plus available from Micromeritics Instrument Corporation.

Example 2

Preparation of Exemplary PVC Profile Compositions

Exemplary PVC profile compositions in accordance with the present invention contain the components recited in Table 2.

TABLE 2

Exemplary PVC Profile Compositions

| Sample | S-PVC K-67[1] (phr) | Ca/Zn OP[2] (phr) | Acrylic Impact Modifier 1 [KM-376L[3]] (phr) | Acrylic Impact Modifier 2 [KM-370[3]] (phr) | CaCO$_3$-A[4] (phr) | TiO$_2$ [KRONOS-CL 2220[5]] (phr) |
|---|---|---|---|---|---|---|
| E1  | 100 | 3.5 | 6.0 | —   | 8.0  | 4.0 |
| E2  | 100 | 3.5 | —   | 6.0 | 8.0  | 4.0 |
| E3  | 100 | 3.5 | —   | 6.0 | 16.0 | 4.0 |
| E4  | 100 | 3.5 | 5.2 | —   | 10.0 | 4.0 |
| E5  | 100 | 3.5 | 4.5 | —   | 10.0 | 4.0 |
| E6  | 100 | 3.5 | 3.6 | —   | 10.0 | 4.0 |
| E7  | 100 | 3.5 | 5.2 | —   | 7.0  | 4.0 |
| E8  | 100 | 3.5 | 4.5 | —   | 7.0  | 4.0 |
| E9  | 100 | 3.5 | 3.6 | —   | 7.0  | 4.0 |
| E10 | 100 | 3.5 | 5.2 | —   | 4.0  | 4.0 |
| E11 | 100 | 3.5 | 4.5 | —   | 4.0  | 4.0 |
| E12 | 100 | 3.5 | 3.6 | —   | 4.0  | 4.0 |
| E13 | 100 | 3.5 | 5.2 | —   | 12.0 | 4.0 |

[1]Available from Shin Etsu
[2]Available from Chemson (Oyak Group)
[3]Available from The Dow Chemical Company
[4]Available from Omya
[5]Available from KRONOS All compositions were prepared by dry-blending using a high speed hot/cold mixer. All compositions were heated to 120° C. and mixed in the hot mixer for about 6 minutes at 2600-3200 rpm, and then cooled to a temperature of 40° C. and mixed in the cold mixer for about 6 minutes at 600 to 1100 rpm.

Example 3

Preparation of Comparative PVC Profile Compositions

Comparative PVC profile compositions contain the components recited in Table 3.

TABLE 3

Comparative PVC Profile Compositions

| Sample | S-PVC K-67[1] (phr) | Ca/Zn OP[2] (phr) | Acrylic Impact Modifier 1 [KM-376L[3]] (phr) | Acrylic Impact Modifier 2 [KM-370[3]] (phr) | CaCO$_3$-B[4] (phr) | TiO$_2$ [KRONOS-CL 2220[5]] (phr) |
|---|---|---|---|---|---|---|
| C1 | 100 | 3.5 | 5.2 | —   | 7.0  | 4.0 |
| C2 | 100 | 3.5 | 5.2 | —   | 10.0 | 4.0 |
| C3 | 100 | 3.5 | 5.2 | —   | 12.0 | 4.0 |
| C4 | 100 | 3.5 | —   | 6.0 | 8.0  | 4.0 |
| C5 | 100 | 3.5 | 6.0 | —   | 8.0  | 4.0 |
| C6 | 100 | 3.5 | —   | 6.0 | 16.0 | 4.0 |
| C7 | 100 | 3.5 | —   | —   | 10   | 4.0 |
| C8 | 100 | 3.5 | 5.2 | —   | —    | 4.0 |

[1]Available from Shin Etsu
[2]Available from Chemson (Oyak Group)
[3]Available from The Dow Chemical Company
[4]Available from Omya
[5]Available from KRONOS All compositions were prepared by dry-blending using a high speed hot/cold mixer. All compositions were heated to 120° C. and mixed in the hot mixer for about 6 minutes at 2600-3200 rpm, and then cooled to a temperature of 40° C. and mixed in the cold mixer for about 6 minutes at 600 to 1100 rpm.

Example 4

Impact Strength Characterization of Exemplary PVC Profile Compositions

The single-V notch-Charpy impact strength (measured per ISO 179-1/1 eC) of inventive PVC profile compositions as prepared in Example 2 was evaluated as shown in Table 4.

TABLE 4

Impact Strength of Inventive PVC Profile Compositions

| Sample | Impact Strength (KJ/m$^2$) | Brittle Break (%) | Wall Thickness (mm) |
|---|---|---|---|
| E1  | 45.7 ± 12.4 | 30  | 2.95 ± 0.05 |
| E2  | 14.8 ± 0.4  | 100 | 2.99 ± 0.01 |
| E3  | 62.8 ± 1.2  | 0   | 2.89 ± 0.01 |
| E4  | 68.3 ± 3.5  | 0   | 2.89 ± 0.01 |
| E5  | 66.3 ± 2.3  | 0   | 2.83 ± 0.01 |
| E6  | 15.8 ± 1.4  | 100 | 2.75 ± 0.12 |
| E7  | 65.5 ± 1.3  | 0   | 2.86 ± 0.01 |
| E8  | 15.7 ± 1.4  | 100 | 2.85 ± 0.01 |
| E9  | 12.9 ± 0.5  | 100 | 2.94 ± 0.01 |
| E10 | 21.3 ± 8.2  | 90  | 2.81 ± 0.01 |
| E11 | 14.7 ± 1.0  | 100 | 2.82 ± 0.01 |
| E12 | 13.5 ± 0.5  | 100 | 2.71 ± 0.01 |
| E13 | 68.6 ± 0.6  | 0   | 2.96 ± 0.02 |

All samples were evaluated according to the ISO 179-1/1 eC impact test, with Charpy sample specimens having a 50 mm×6 mm×the wall thickness reported in Table 4.

Example 5

Impact Strength Characterization of Comparative PVC Profile Compositions

The single-V notch-Charpy impact strength (measured per ISO 179-1/1 eC) of comparative PVC profile compositions as prepared in Example 3 was evaluated as shown in Table 5.

TABLE 5

Impact Strength of Comparative PVC Profile Compositions

| Sample | Impact Strength (KJ/m$^2$) | Brittle Break (%) | Wall Thickness (mm) |
|---|---|---|---|
| C1 | 12.3 ± 0.4 | 100 | 2.92 ± 0.02 |
| C2 | 12.8 ± 0.6 | 100 | 3.01 ± 0.01 |
| C3 | 12.2 ± 0.5 | 100 | 2.92 ± 0.01 |
| C4 | 11.3 ± 0.3 | 100 | 3.00 ± 0.02 |
| C5 | 12.9 ± 0.5 | 100 | 2.98 ± 0.03 |
| C6 | 13.3 ± 0.4 | 100 | 2.96 ± 0.01 |
| C7 | 9.8 ± 0.4  | 100 | 2.82 ± 0.01 |
| C8 | 14.0 ± 1.2 | 100 | 2.71 ± 0.01 |

The impact strength characterization was carried out in accordance with the procedures described in Example 4.

Example 6

Impact Strength Profile Comparison of Exemplary and Comparative PVC Profile Compositions FIG. 1 shows the impact strength profiles of inventive examples E7, E4, and E13 as determined in Example 4 compared against comparative examples C1, C2, and C3 as determined in Example 5. The data demonstrates that PVC profile compositions prepared in accordance with the present invention provide an unexpected increase in impact strength.

Figure 2:
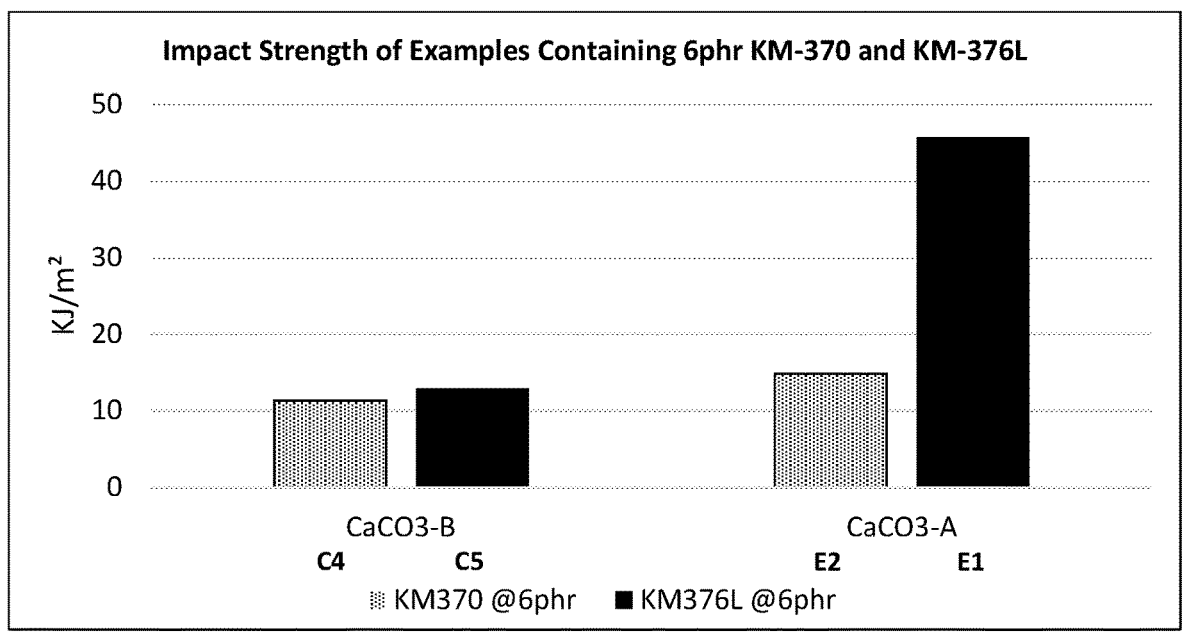
FIG. 2 shows the impact strength profiles of exemplary PVC profile compositions in accordance with the present invention and comparative PVC profile compositions.

FIG. 2 shows the impact strength profiles of inventive examples E1 and E2 as determined in Example 4 compared against comparative examples C4 and C5 as determined in Example 5. The data demonstrates that PVC profile compositions prepared in accordance with the present invention provide an unexpected increase in impact strength.

Figure 3:
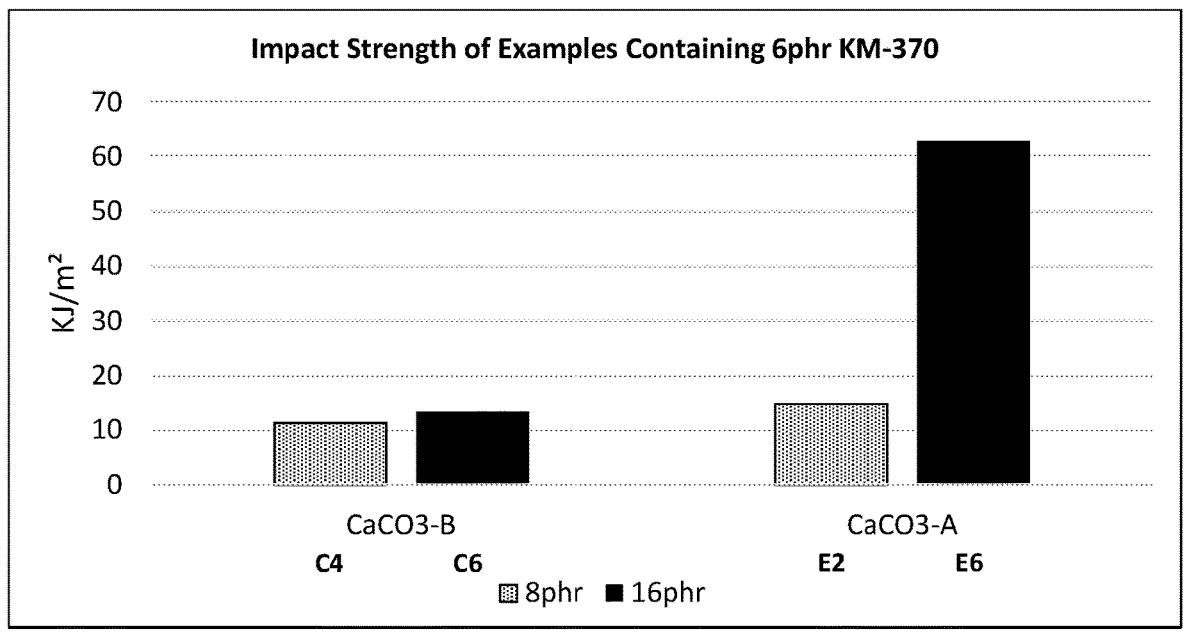
FIG. 3 shows the impact strength profiles of exemplary PVC profile compositions in accordance with the present invention and comparative PVC profile compositions.

FIG. 3 shows the impact strength profiles of inventive examples E2 and E6 as determined in Example 4 compared against comparative examples C4 and C6 as determined in Example 5. The data demonstrates that PVC profile compositions prepared in accordance with the present invention provide an unexpected increase in impact strength.

Example 7

Extrusion Characterization of Inventive and Comparative PVC Profile Compositions The extrusion characterization of inventive and comparative PVC profile compositions was carried out using a conical twin-screw extruder, fitted with a rectangular profile die, using the extrusion conditions presented in Table 6.

TABLE 6

Extruder Conditions

| Screw | | Set Temperatures | | | | |
|---|---|---|---|---|---|---|
| Speed (rpm) | Temp (° C.) | Barrel 1 (° C.) | Barrel 2 (° C.) | Die 1 (° C.) | Die 2 (° C.) | Die 3 (° C.) |
| 30 | 150 | 170 | 170 | 190 | 190 | 190 |

The extrusion characteristics of inventive PVC profile compositions as prepared in Example 2 were evaluated as shown in Table 7.

TABLE 7

Extrusion Characteristics of Inventive PVC Profile Compositions

| | | Melt Pressure and Temperature | | | | | |
|---|---|---|---|---|---|---|---|
| Sample | Torque (amps) | Pressure P1 before vent (mPa) | Pressure P2 after vent (mPa) | Die Pressure P head (mPa) | Temp Melt (° C.) | Head Melt (° C.) | Output (kg/hr) |
| E1 | 3.64 | 1.1 | 11.2 | 20.3 | 158 | 171 | 11.2 |
| E2 | 3.48 | 0.6 | 9.3 | 20.7 | 156 | 171 | 10.6 |
| E3 | 3.55 | 0.9 | 9.9 | 22.0 | 156 | 172 | 10.6 |
| E4 | 3.66 | 0.9 | 11.3 | 21.8 | 156 | 172 | 10.7 |
| E5 | 3.54 | 0.7 | 10.0 | 21.2 | 155 | 171 | 10.5 |
| E6 | 3.44 | 0.7 | 9.0 | 20.9 | 154 | 171 | 10.4 |
| E7 | 3.57 | 0.9 | 11.0 | 21.4 | 157 | 171 | 10.6 |
| E8 | 3.50 | 0.7 | 10.1 | 21.2 | 155 | 171 | 10.5 |
| E9 | 3.53 | 0.8 | 10.5 | 21.2 | 155 | 171 | 10.8 |
| E10 | 3.43 | 0.8 | 9.4 | 20.6 | 155 | 170 | 10.2 |
| E11 | 3.40 | 0.7 | 9.0 | 20.5 | 155 | 170 | 10.3 |
| E12 | 3.25 | 0.5 | 6.1 | 18.6 | 154 | 170 | 9.3 |
| E13 | 3.60 | 0.9 | 11.0 | 21.5 | 158 | 172 | 11.2 |

The extrusion characteristics of comparative PVC profile compositions as prepared in Example 3 were evaluated as shown in Table 8.

TABLE 8

Extrusion Characteristics of Comparative PVC Profile Compositions

| | | Melt Pressure and Temperature | | | | | |
|---|---|---|---|---|---|---|---|
| Sample | Torque (amps) | Pressure P1 before vent (mPa) | Pressure P2 after vent (mPa) | Die Pressure P head (mPa) | Temp Melt (° C.) | Head Melt (° C.) | Output (kg/hr) |
| C1 | 3.58 | 0.9 | 9.9 | 19.7 | 157 | 171 | 10.7 |
| C2 | 3.72 | 1.0 | 11.5 | 20.8 | 159 | 172 | 11.3 |
| C3 | 3.74 | 1.1 | 12.0 | 21.2 | 159 | 172 | 11.2 |
| C4 | 3.60 | 1.0 | 11.1 | 20.9 | 157 | 171 | 11.1 |
| C5 | 3.65 | 1.1 | 11.3 | 20.7 | 158 | 172 | 11.1 |
| C6 | 3.60 | 0.9 | 10.7 | 22.3 | 156 | 172 | 10.8 |
| C7 | 3.26 | 0.4 | 6.3 | 20.0 | 151 | 170 | 10.5 |
| C8 | 3.15 | 0.5 | 4.8 | 18.6 | 153 | 169 | 8.9 |

The extrusion data demonstrates that the extrusion characteristics of the inventive PVC profile compositions perform at least as good as those prepared with the comparative PVC profile compositions. Both the extruder torque and melt pressure increase as addition levels of impact modifiers and GCC in the compositions increase.

Example 9

Gloss and Color Characterization of Inventive and Comparative PVC Profile Compositions The gloss and color characteristics of inventive and comparative PVC profile compositions was measured on the surface of extruded profiles, according to the ISO 7724 Standard, using a BYK Spectro-Guide, model 6834.

The gloss and color characterization of inventive PVC profile composition as prepared in Example 2 were evaluated as shown in Table 9.

TABLE 9

Gloss and Color Characterization of Inventive PVC Profile Compositions

| Sample | Gloss Unit (60°) | L* | a* | b* |
|---|---|---|---|---|
| E1 | 43.9 | 95.17 | −0.02 | 3.41 |
| E2 | 50.7 | 94.76 | −0.01 | 3.51 |
| E3 | 49.4 | 94.49 | −0.00 | 4.55 |
| E4 | 49.7 | 94.77 | −0.21 | 3.66 |
| E5 | 46.4 | 95.17 | −0.06 | 3.40 |
| E6 | 43.9 | 95.22 | −0.07 | 3.40 |
| E7 | 47.6 | 95.18 | −0.14 | 3.33 |
| E8 | 45.1 | 95.24 | −0.09 | 3.18 |
| E9 | 42.8 | 95.26 | −0.06 | 3.07 |
| E10 | 39.4 | 95.44 | −0.08 | 2.94 |
| E11 | 38.3 | 95.41 | −0.08 | 2.90 |
| E12 | 39.0 | 95.02 | −0.17 | 3.03 |
| E13 | 50.2 | 95.00 | −0.01 | 3.95 |

The gloss and color characterization of comparative PVC profile composition as prepared in Example 3 were evaluated as shown in Table 10.

TABLE 10

Gloss and Color Characterization of Comparative PVC Profile Compositions

| Sample | Gloss Unit (60°) | L* | a* | b* |
|---|---|---|---|---|
| C1 | 31.9 | 94.45 | −0.01 | 3.19 |
| C2 | 37.1 | 94.29 | −0.10 | 3.55 |

TABLE 10-continued

Gloss and Color Characterization of Comparative PVC Profile Compositions

| Sample | Gloss Unit (60°) | L* | a* | b* |
|---|---|---|---|---|
| C3 | 34.5 | 94.30 | −0.01 | 3.73 |
| C4 | 38.5 | 94.76 | −0.06 | 4.00 |
| C5 | 38.3 | 94.52 | −0.06 | 3.41 |
| C6 | 32.5 | 94.41 | 0.06 | 4.64 |
| C7 | 25.1 | 95.03 | −0.08 | 3.22 |
| C8 | 22.8 | 95.25 | −0.14 | 2.59 |

The data demonstrates that PVC profile compositions prepared in accordance with the present invention provides an unexpected boost with respect to the gloss of extruded profiles when compared against comparative PVC profile compositions. The better color consistency of the inventive PVC profile compositions as compared against comparative PVC profile compositions indicates that a wider extruder-processing window is achieved by compositions according to the present invention.

What is claimed is:

1. A polyvinyl chloride composition comprising:
   (a) polyvinyl chloride having a K value of from K-63 to K-70;
   (b) a multistage acrylic impact modifier comprising
      (i) 65 to 96 weight % of a core polymer, based on the total weight of the multistage polymer, comprising polymerized units derived from (A) 95 to 99.9 weight % of one or more alkyl acrylate monomers, and (B) 0.1 to 1.5 weight % of one or more cross-linking monomers, graft-linking monomers, and combinations thereof, based on the total weight of the core, and
      (ii) 4 to 35 weight % of a shell polymer, based on the total weight of the multistage polymer, comprising polymerized units derived from (A) 95 to 100 weight % of one or more alkyl(meth)acrylate monomers, and (B) 0 to 1.5 weight % of one or more chain transfer agents, based on the total weight of the shell; and
   (c) ground calcium carbonate having (i) a $d_{50}$ particle size value of 400 to 900 nm, (ii) a $d_{98}$ particle size value of less than 2.4 μm, and (iii) a ratio of particles having a $d_{50}$ particle size value to particles having a $d_{20}$ particle size value ($d_{50}/d_{20}$) of less than 2.0.

2. The composition of claim 1, wherein
   (i) the one or more alkyl acrylate monomers of the core are selected from the group consisting of ethyl acrylate, butyl acrylate, 2-ethyl hexyl acrylate, cyclopentyl acrylate, cyclohexyl acrylate, benzyl acrylate, and isooctylacrylate, and combinations thereof, and the one or more cross-linking monomers, graft-linking monomers, and combinations thereof of the core are selected from the group consisting of butanediol di(meth)acrylate, ethylene glycol di(meth)acrylate, divinyl benzene, diethylene glycol di(meth)acrylate, diallyl maleate, ally acrylate, allyl methacrylate, diallyl phthalate, triallyl phthalate, trimethylolpropane tri(meth)acrylate, and combinations thereof; and
   (ii) the one or more alkyl(meth)acrylate monomers of the shell are selected from the group consisting of methyl methacrylate, ethyl acrylate, butyl acrylate, butyl methacrylate, 2-ethyl hexyl acrylate, cyclopentyl acrylate, cyclohexyl acrylate, benzyl acrylate, benzyl methacrylate, isooctylacrylate, and combinations thereof, and the one or more chain transfer agents are selected from the group consisting of 1-dodecanethiol, t-dodecanethiol, thioethanol, hexanethiol, mercaptopropionic acid, methyl-3-mercaptopropionate, butyl-3-mercaptopropionate, and combinations thereof.

3. The composition of claim 1, wherein
   (i) the one or more alkyl acrylate monomers of the core are selected from the group consisting of butyl acrylate, 2-ethylhexyl acrylate, and combinations thereof, and the one or more cross-linking monomers, graft-linking monomers, and combinations thereof of the core is allyl methacrylate; and
   (ii) the one or more alkyl(meth)acrylate monomers of the shell is methyl methacrylate.

4. The composition of claim 1, wherein the impact modifier (b) is present in an amount of from 1 to 8 phr, based on the total weight of the polyvinyl chloride profile composition, and wherein the ground calcium carbonate (c) is present in an amount of from 4 to 25 phr, based on the total weight of the polyvinyl chloride profile composition.

5. The composition of claim 1, wherein the impact modifier (b) is present in an amount of from 4 to 6 phr, based on the total weight of the polyvinyl chloride profile composition, and wherein the ground calcium carbonate (c) is present in an amount of from 6 to 16 phr, based on the total weight of the polyvinyl chloride profile composition.

6. The composition of claim 1, wherein the polyvinyl chloride has a K value of from K-65 to K-68.

7. An article of manufacture comprising the polyvinyl chloride composition of claim 1, wherein the article of manufacture is selected from the group consisting of window profiles, pipes, technical profiles, wall panels, ceiling panels, cladding panels, or wire insulation.

8. A polyvinyl chloride composition comprising:
   (a) polyvinyl chloride having a K value of from K-65 to K-68;
   (b) a multistage acrylic impact modifier comprising
      (i) 65 to 96 weight % of a core polymer, based on the total weight of the multistage acrylic impact modifier, comprising polymerized units derived from (A) 95 to 99.9 weight % of one or more alkyl acrylate monomers, and (B) 0.1 to 1.5 weight % of one or more cross-linking monomers, graft-linking monomers, and combinations thereof, based on the total weight of the core; and
      (ii) 4 to 35 weight % of a shell polymer, based on the total weight of the multistage acrylic impact modifier, comprising polymerized units derived from (A) 95 to 100 weight % of one or more alkyl(meth)acrylate monomers, and (B) 0 to 2 weight % of one or more chain transfer agents, based on the total weight of the shell; and
   (c) ground calcium carbonate having (i) a $d_{50}$ particle size value of 400 to 900 nm, (ii) a $d_{98}$ particle size value of less than 2.4 μm, and (iii) a ratio of particles having a $d_{50}$ particle size value to particles having a $d_{20}$ particle size value ($d_{50}/d_{20}$) of less than 2.0.

* * * * *